(12) United States Patent
Kajiura

(10) Patent No.: US 6,316,910 B1
(45) Date of Patent: Nov. 13, 2001

(54) SUPPORTING DEVICE FOR POWER SUPPLY PADDLE

(75) Inventor: Katsuyuki Kajiura, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/723,441

(22) Filed: Nov. 28, 2000

(30) Foreign Application Priority Data

Dec. 8, 1999 (JP) .................................................. 11-349192

(51) Int. Cl.⁷ ............................................................ H02J 7/00
(52) U.S. Cl. ............................................. 320/108; 320/109
(58) Field of Search ........................................ 320/108, 109, 320/107, 101; 336/DIG. 2

(56) References Cited

U.S. PATENT DOCUMENTS

| | | | |
|---|---|---|---|
| 5,323,099 | * 6/1994 | Bruni et al. | 320/108 |
| 5,461,229 | * 10/1995 | Bruni | 320/108 |
| 5,461,299 | 10/1995 | Bruni | 320/108 |

* cited by examiner

Primary Examiner—Peter S. Wong
Assistant Examiner—Lawrence Luk
(74) Attorney, Agent, or Firm—Woodcock Washburn Kurtz Mackiewicz & Norris LLP

(57) ABSTRACT

The first accommodation space forming body is joined to the supporting base plate, and the second accommodation space forming body is joined to the first accommodation space forming body. Accommodation space S is formed between the accommodation space forming bodies. The positioning body is joined to the second accommodation space forming body. The accommodation space forming bodies are fixed onto the supporting base plate by screwing the screws. The profile and size of the first accommodation space forming body are the same as those of the second accommodation space forming body. The accommodation space forming bodies are joined to each other by the engagement of the engaging protrusions with the engaging recesses.

9 Claims, 11 Drawing Sheets

SUPPORTING DEVICE FOR POWER SUPPLY PADDLE

BACKGROUND OF THE INVENTION

1. Field of the Invention

The present invention relates to a supporting device for a power supply paddle used for feeding electricity from a power source to a power receiving device using electromagnetic induction.

2. Description of the Related Art

Concerning a charger for charging a battery, which is incorporated into an automobile, with electricity, there is provided a charger having a power supply paddle for feeding electricity from a power source to a power receiving device using electromagnetic induction. FIG. 11 is a view showing an example of the charger. The power supply paddle 1 is attached to an end of the feeder cable 3 extending from the feeder stand 2 installed on the ground. The electric automobile 5 into which the battery 4 is incorporated has a charging port 6 which is a power receiving device. As shown by chain lines in the drawing, the power supply paddle 1 is inserted into the insertion hole of the charging port 6. When the power supply paddle 1 is inserted into the insertion hole of the charging port 6 in this way, the battery 4 is electrically charged by electromagnetic induction between the coil provided on the power supply paddle 1 side and the coil provided on the charging port 6 side.

While the power supply paddle 1 is not being used, the power supply paddle 1 is inserted into and held by the supporting section 7 provided in the feeder stand 2. The manufacturing cost of the entire charger may be high according to the structure of the supporting section 7.

SUMMARY OF THE INVENTION

It is an object of the present invention to provide a supporting device, for a power supply paddle, the manufacturing cost of which is advantageously low.

In order to accomplish the object, the present invention provides a supporting device for a power supply paddle for feeding electricity from a power source to a power receiving device, using electromagnetic induction, comprising: a first accommodation space forming body for forming an accommodation space to accommodate the power supply paddle capable of being taken in and out; and a second accommodation space forming body for forming an accommodation space to accommodate the power supply paddle when combined with the first accommodation space forming body in such a manner that the second accommodation space forming body is opposed to the first accommodation space forming body, wherein the profile and size of the first accommodation space forming body is the same as those of the second accommodation space forming body, engaging protrusions and engaging recesses, the numbers of which are the same, are provided on one face of the first accommodation space forming body and also on one face of the second accommodation space forming body, and the engaging protrusions of one of the first accommodation space forming body and the second accommodation space forming body are engaged with the engaging recesses of the other accommodation space forming body so that the accommodation space is formed between the first accommodation space forming body and the second accommodation space forming body.

When the engaging protrusions of one of the first and the second accommodation space forming body are engaged with the engaging recesses of the other of the first and the second accommodation space forming body, the first and the second accommodation space forming body are opposed to each other so that they can form the accommodation space. The structure in which a pair of accommodation space forming bodies of the same profile and size are combined with each other is effective for suppressing an increase in the manufacturing cost of the supporting device.

The present invention may be more fully understood from the description of the preferred embodiments of the invention set forth below together with the accompanying drawings.

DESCRIPTION OF THE PREFERRED EMBODIMENTS

Referring to FIGS. 1 to 8, the first embodiment of the present invention will be explained as follows.

Figure 1:
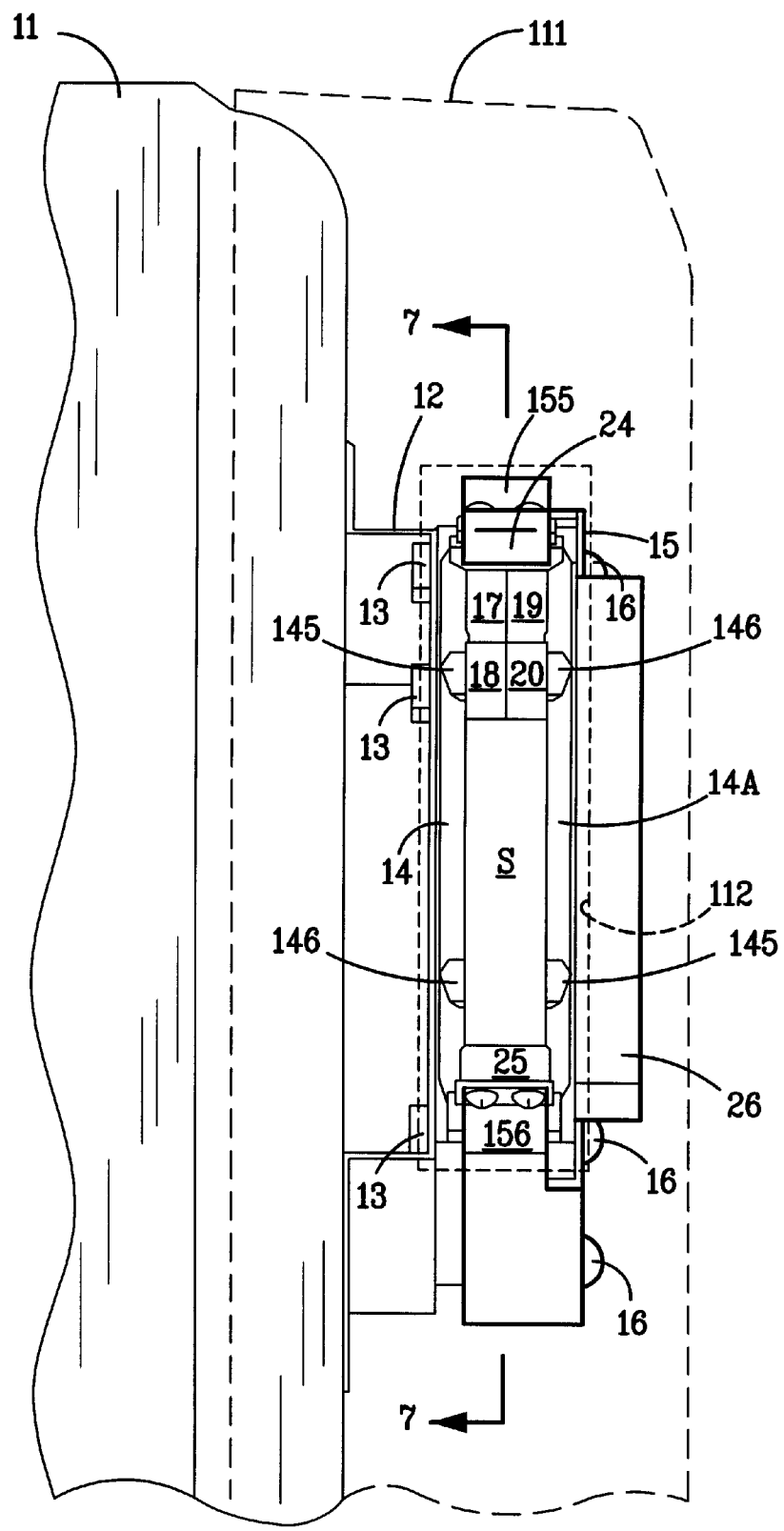
FIG. 1 is a front view showing a supporting device for a power supply paddle of the first embodiment of the present invention.
Figure 3:
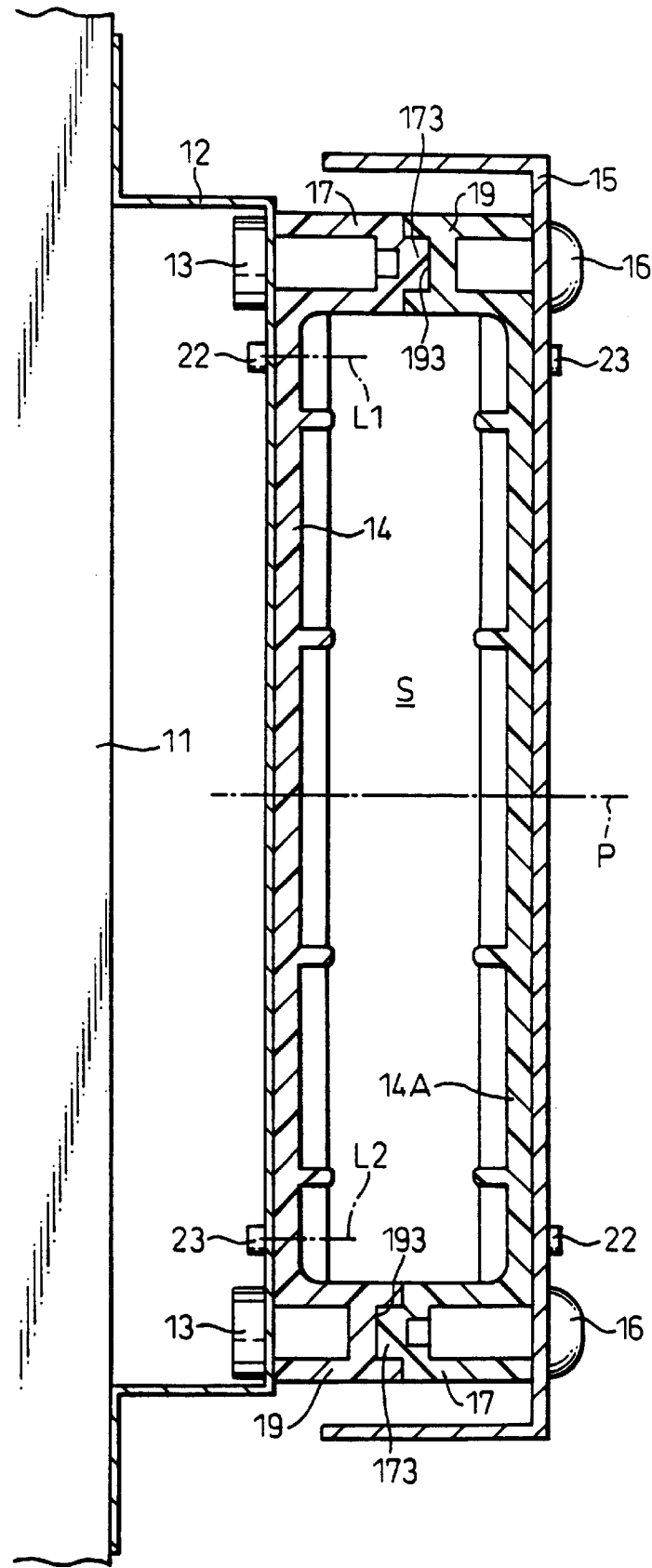
FIG. 3 is a cross-sectional view taken on line 3—3 in FIG. 2.
Figure 5:
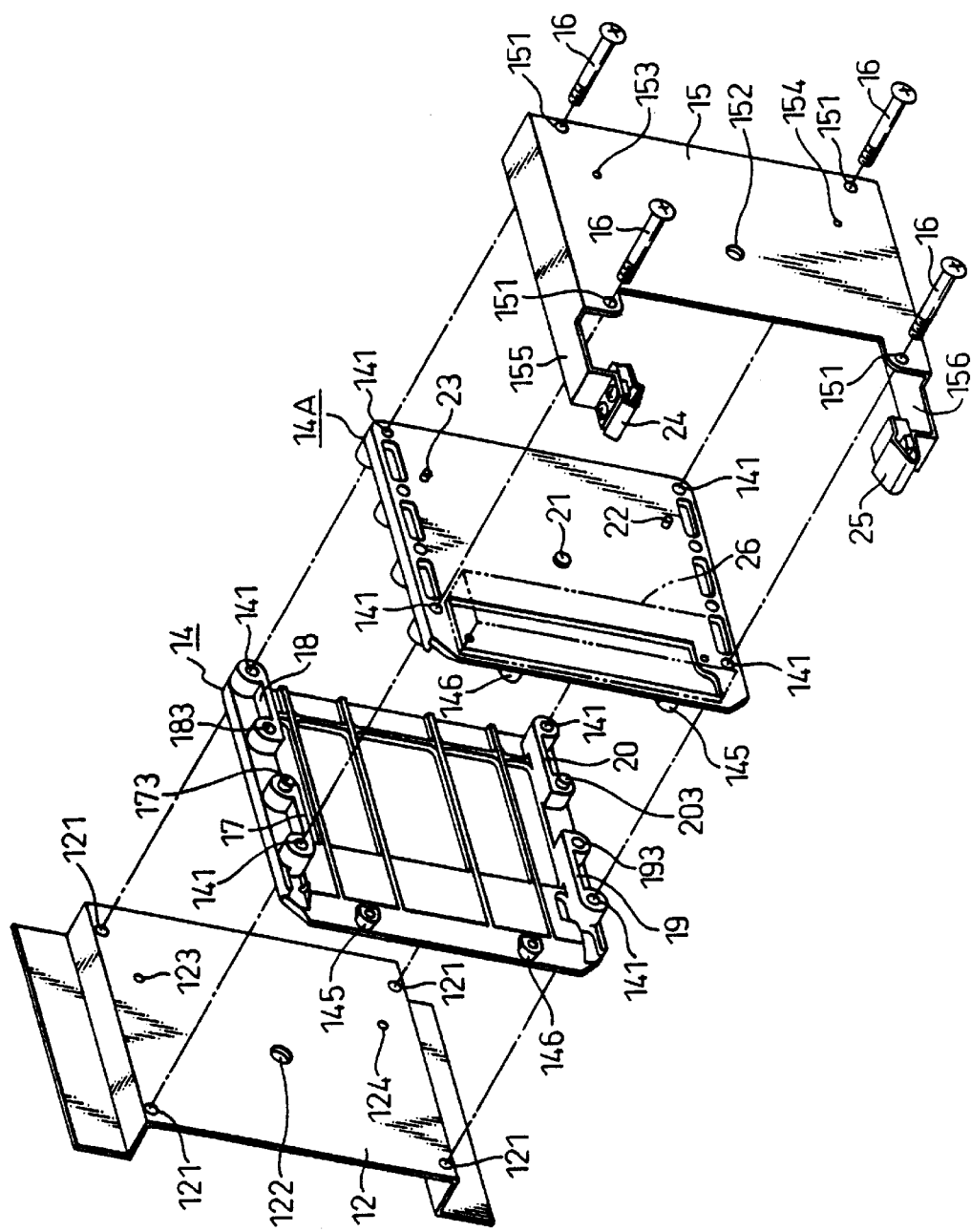
FIG. 5 is an exploded perspective view of the supporting device for the power supply paddle of the present invention, wherein a portion of the supporting device for the power supply paddle is omitted in the drawing.

As shown in FIG. 1, there is provided a supporting base plate 12 on the side of the feeder stand 11 which is a power source. As shown in FIG. 5, a plurality of insertion holes 121 are formed on the supporting base plate 12. In this embodiment, four insertion holes 121 are formed on the supporting base plate 12. As shown in FIG. 3, a plurality of nuts 13 are attached onto the inside of the supporting base plate 12 corresponding to the respective insertion holes 121. The first accommodation space forming body 14 made of synthetic resin is joined onto the supporting base plate 12. The second accommodation space forming body 14A made of synthetic resin is joined onto the first accommodation space forming body 14. Accommodation space S is formed between the first accommodation space forming body 14 and the second accommodation space forming body 14A. The positioning body 15 is joined to the second accommodation space forming body 14A. As shown in FIG. 5, a plurality of insertion holes 141 are formed in the accommodation space forming bodies 14, 14A corresponding to the insertion holes 121. In the positioning body 15, a plurality of insertion holes 151 are formed corresponding to the insertion holes 121. Screws 16 are screwed into the nuts 13 through the insertion holes 151, 141, 121. The accommodation space forming bodies 14, 14A and the positioning body 15 are fixed to the supporting base plate 12 by the screws 16. The supporting base plate 12, the accommodation space forming bodies 14, 14A and the positioning body 15 are accommodated inside the cover 111 attached onto the side of the feeder stand 11. As shown in FIG. 1, there is provided an insertion port 112 on the cover 111. This insertion port 112 is opposed to the accommodation space S.

Figure 6:
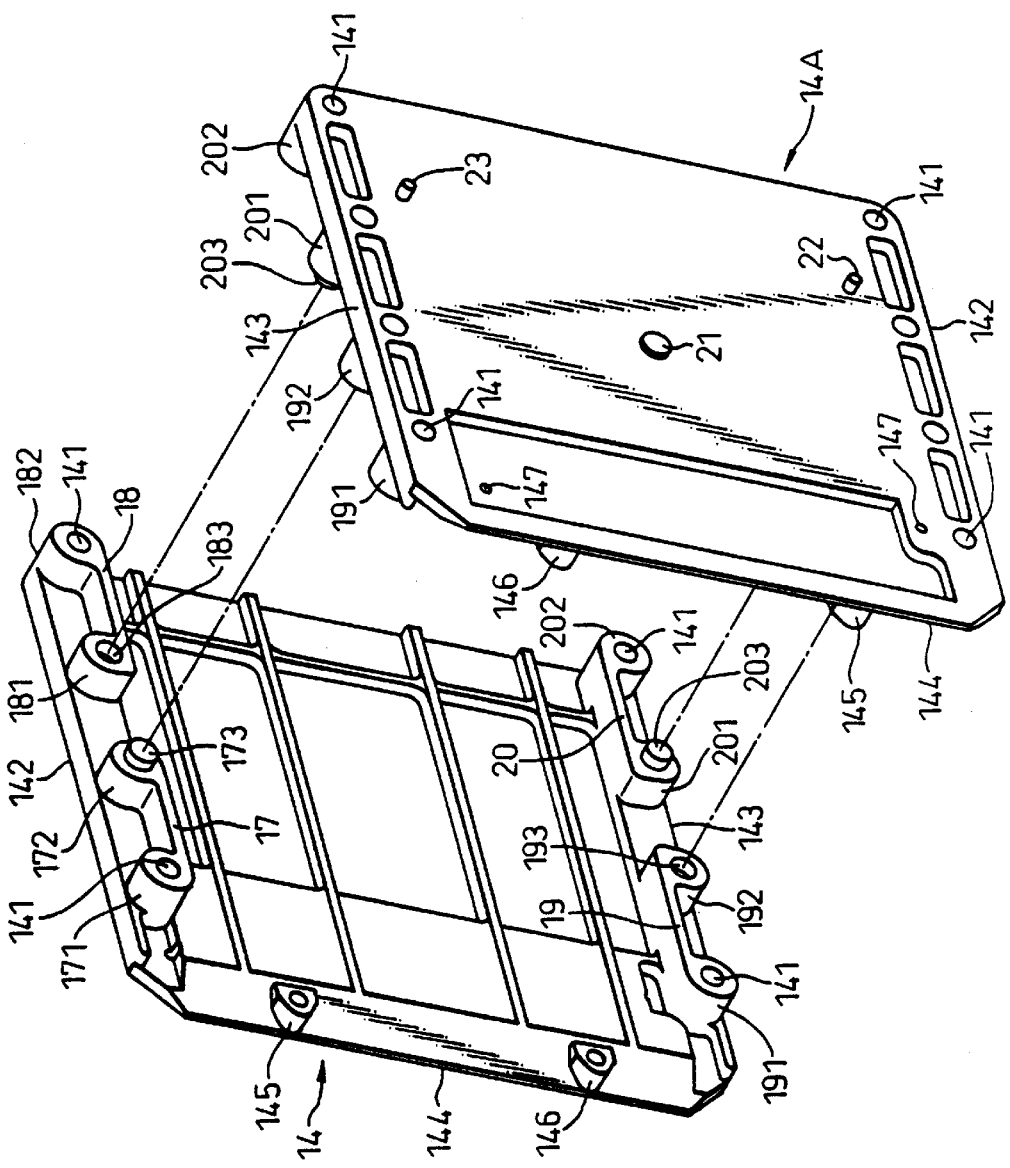
FIG. 6 is an exploded perspective view of the supporting device for the power supply paddle of the present invention, wherein a primary portion of the supporting device of the power supply paddle is shown in the drawing.
Figure 7:
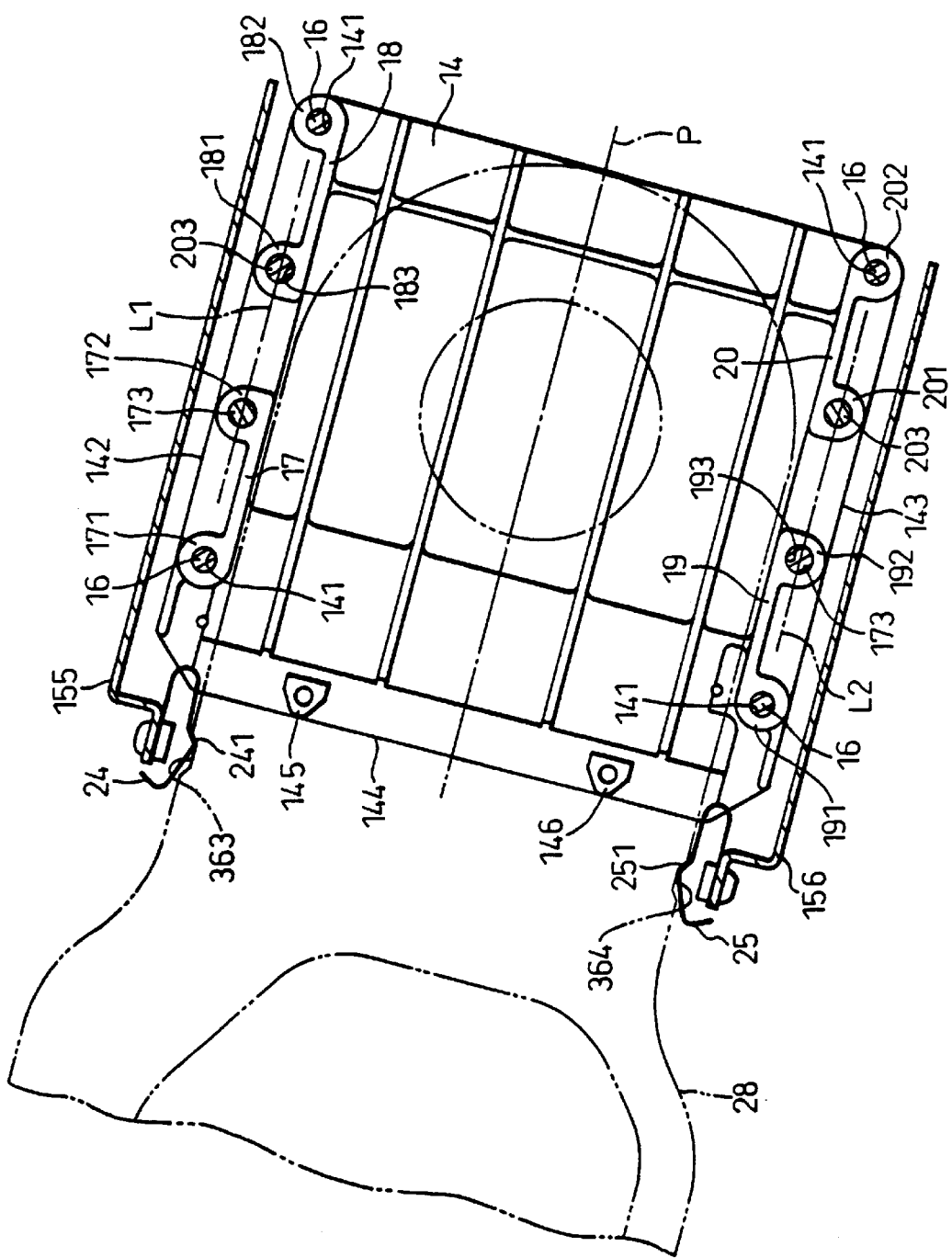
FIG. 7 is a cross-sectional view taken on line 7—7 in FIG. 1.

As shown in FIGS. 5 and 6, on the inner face (the face on the viewer's side in FIG. 5 or 6) of the rectangular sheet-shaped first accommodation space forming body 14, there are provided an even number of guiding protrusions 17, 18, 19, 20 (in this embodiment, four guiding protrusions) which are integrally protruded from the inner face of the rectangular sheet-shaped first accommodation space forming body 14. Heights of the guiding protrusions 17, 18, 19, 20 are equal to each other. A pair of guiding protrusions 17, 18 are arranged in series along one side 142 of the rectangular sheet-shaped accommodation space forming body 14, and a pair of guiding protrusions 19, 20 are arranged in series along one side 143 of the rectangular sheet-shaped accommodation space forming body 14 opposed to the side 142. The pair of guiding protrusions 17, 18 and the pair of guiding protrusions 19, 20 are parallel with each other. In each guiding protrusion 17, 18, 19, 20, a pair of columnar sections 171, 172, 181, 182, 191, 192, 201, 202 are integrally formed. As shown in FIG. 7, the columnar sections 171, 172, 181, 182 are arranged on one plane L1, and the columnar sections 191, 192, 201, 202 are arranged on plane L2 different from plane L1. As shown in FIG. 6, the insertion holes 141 are formed in such a manner that they penetrate the columnar sections 171, 182, 191, 202 located at four corners of the rectangular sheet-shaped accommodation space forming body 14.

At the forward end of the columnar section 172 of the guiding protrusion 17, the columnar engaging protrusion 173 is integrally formed and, at the forward end of the columnar section 201 of the guiding protrusion 20, the columnar engaging protrusion 203 is integrally formed. At the forward end of the columnar section 181 of the guiding protrusion 18, the columnar engaging recess 183 is formed, and at the forward end of the columnar section 192 of the guiding protrusion 19, the columnar engaging recess 193 is formed. A pair of positioning protrusions 145, 146 are integrally formed on the side 144 of the rectangular sheet-shaped accommodation forming body 14.

The engaging protrusion 173 and the engaging recess 183 are located on plane L1, and the engaging recess 193 and the engaging protrusion 203 are located on plane L2. Planes L1 and L2, which are parallel to each other, are reflection-symmetrical to each other with respect to plane P. The engaging protrusion 173 and the engaging recess 193 are opposed to each other, and accommodation space S is interposed between the engaging protrusion 173 and the engaging recess 193. The engaging recess 183 and the engaging protrusion 203 are opposed to each other with respect to accommodation space S. Further, a pair of positioning protrusions 145, 146 are reflection-symmetrical to each other. Furthermore, the insertion hole 141 on the side 142 and the insertion hole 141 on the side 143 are reflection-symmetrical to each other. That is, the intermediate position between the engaging protrusion 173 and the engaging recess 193, the intermediate position between the engaging recess 183 and the engaging protrusion 203, the intermediate position between the positioning protrusion 145 and the positioning protrusion 146, and the intermediate position between the insertion hole 141 on the side 142 and the insertion hole 141 on the side 143 are located on plane P by which plane L1 and plane L2 are set in a relation of reflection-symmetry.

On the outer face (the face on the viewer's side in FIGS. 5 and 6) of the rectangular sheet-shaped second accommodation space forming body 14A, a plurality of positioning protrusions 22, 23 are integrally formed. As shown in FIG. 3, the positioning protrusion 22 and the positioning protrusion 23 are reflection-symmetrical with respect to plane P. As shown in FIG. 5, the positioning holes 153, 154 are formed in the positioning body 15. The positioning protrusions 22, 23 of the second accommodation space forming body 14A are closely engaged with the positioning holes 154, 153 of the positioning body 15. Reference numeral 21 is burr of the resin injection port formed in the process of molding resin. Reference numeral 152 is a run-off hole of the burr 21.

The profile and size of the first accommodation space forming body 14 are the same as those of the second accommodation space forming body 14A. The guiding protrusions 17, 18, 19, 20, columnar sections 171, 172, 181, 182, 191, 192, 201, 202, engaging protrusions 173, 203, engaging recesses 183, 193 and positioning protrusions 145, 146 are also formed in the second accommodation space forming body 14A. The positioning protrusions 22, 23 are also formed in the first accommodation space forming body 14. The engaging protrusion 173 of the first accommodation space forming body 14 is closely contacted and engaged with the engaging recess 193 of the second accommodation space forming body 14A. The engaging recess 183 of the first accommodation space forming body 14 is closely contacted and engaged with the engaging protrusion 203 of the second accommodation space forming body 14A. The engaging recess 193 of the first accommodation space forming body 14 is closely contacted and engaged with the engaging protrusion 173 of the second accommodation space forming body 14A. The engaging protrusion 203 of the first accommodation space forming body 14 is closely contacted and engaged with the engaging recess 183 of the second accommodation space forming body 14A.

The positioning holes 123, 124 are formed on the supporting base plate 12. The positioning protrusions 22, 23 of the first accommodation space forming body 14 are closely contacted and engaged with the positioning holes 123, 124 of the supporting base plate 12. Reference numeral 122 is a run-off hole of burr 21.

Figure 2:
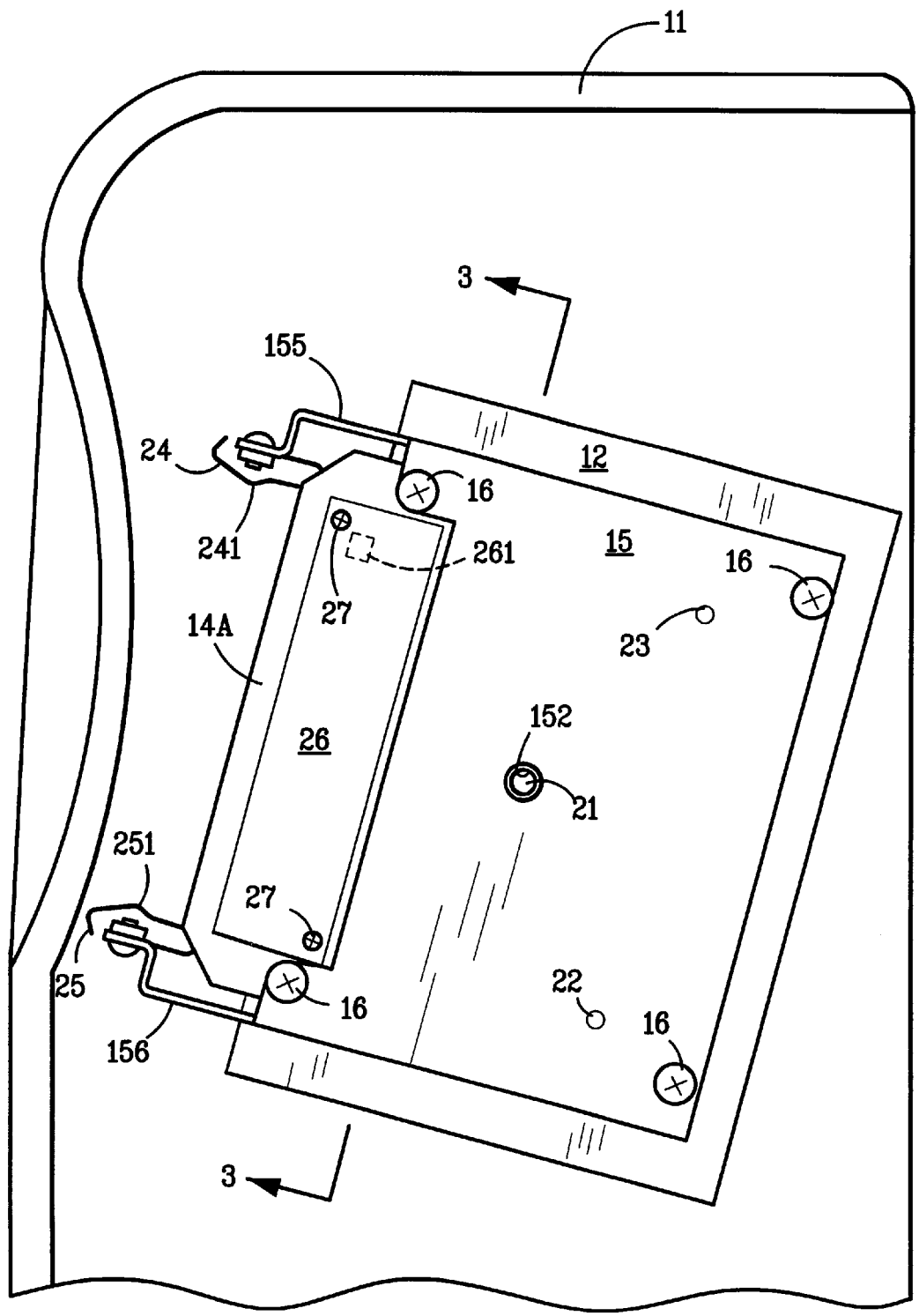
FIG. 2 is a side view showing the supporting device for the power supply paddle.

As shown in FIGS. 1 and 2, a pair of supporting protrusion pieces 155, 156 are arranged in the positioning body 15 while being opposed to each other. The positioning pieces 24, 25 are attached to the supporting protrusion pieces 155, 156 in such a manner that the positioning pieces 24, 25 are opposed to the supporting protrusion pieces 155, 156. The positioning pieces 24, 25 are composed of leaf springs which are bent into the profiles of the positioning pieces. In the positioning pieces 24, 25, the hook sections 241, 251 are formed by bending the positioning pieces 24, 25.

Figure 4:
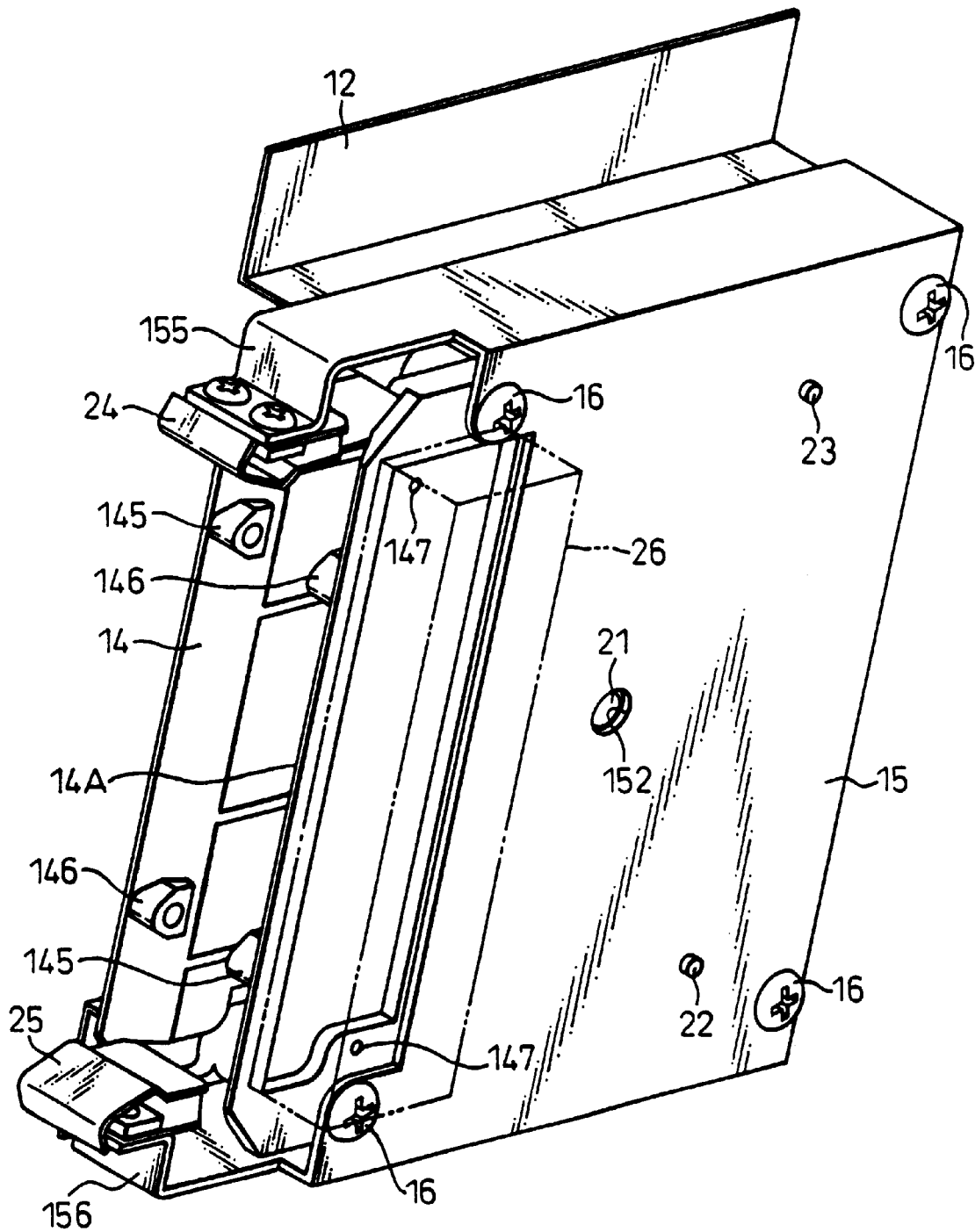
FIG. 4 is a perspective view of the supporting device for the power supply paddle of the present invention, wherein a portion of the supporting device for the power supply paddle is omitted in the drawing.

As shown in FIGS. 2 and 4, the sensor box 26 is attached onto the outside of the second accommodation space forming body 14A. The sensor box 26 is fixed to the second accommodation space forming body 14A by the screws 27 screwed into the screw holes 147 formed in the second accommodation space forming body 14A. In the sensor box 26, there is provided a magnetic detector 261.

Figure 8:
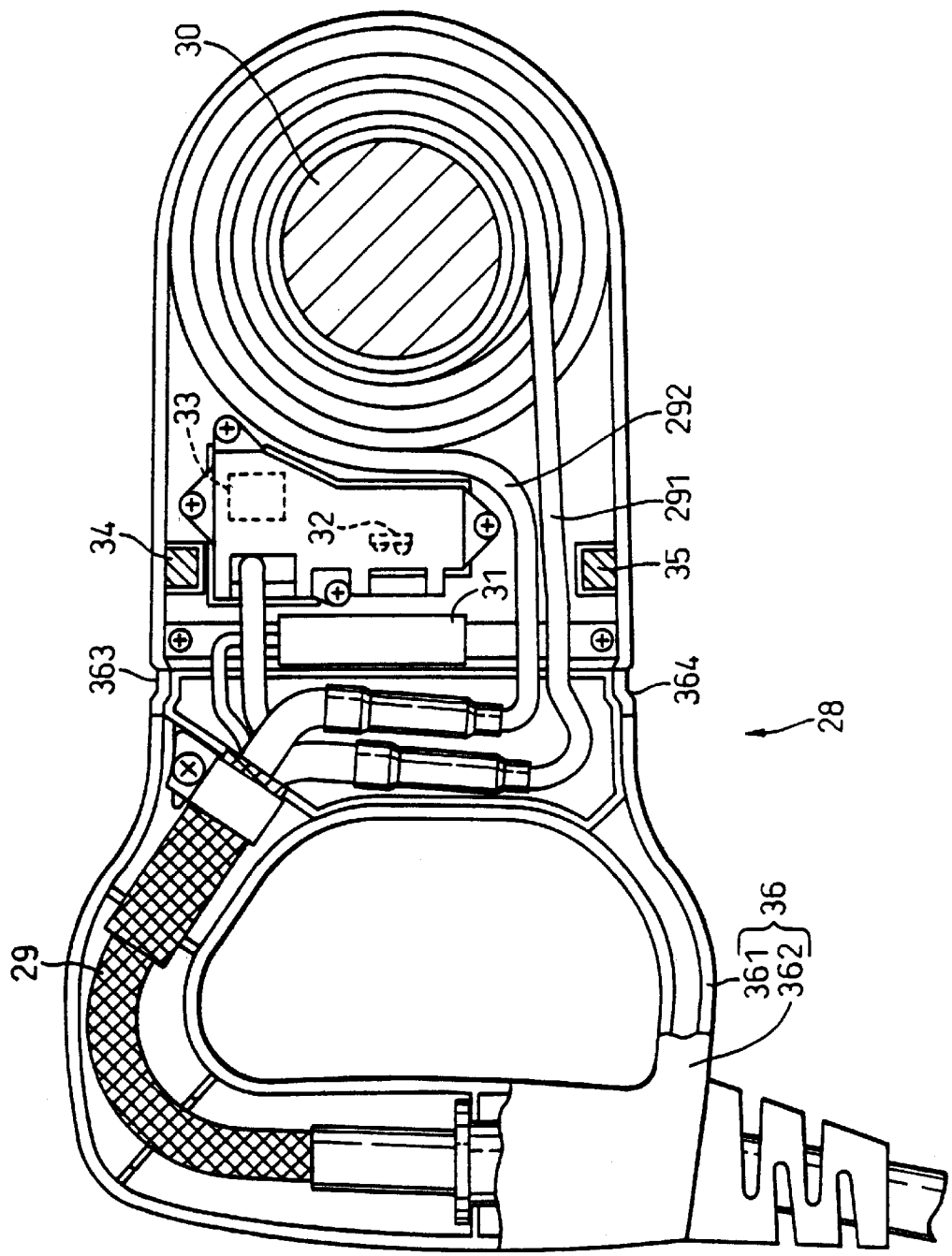
FIG. 8 is a cross-sectional view showing an inner structure of the power supply paddle.

FIG. 8 is a view showing an example of the inner structure of the power supply paddle 28. The case 36 of the power supply paddle 28 is composed of a pair of case pieces 361, 362 which are joined to each other. Feeder wires 291, 292 branching from the feeder cable 29 are wound round the ferrite core 30. When an electric current is made to flow in the feeder wires 291, 292 under the condition that the power supply paddle 28 is inserted into a charging port (not shown) which is a power receiving device, a battery (not shown) electrically connected with the charging port is charged. The communication antenna 31, infrared ray sensor 32 and communication circuit 33 are housed in the power supply paddle 28. The communication circuit 33 drives the infrared ray sensor 32. Charging the battery is carried out while being controlled by a controller (not shown) housed in the feeder stand 11.

When the power supply paddle 28 is pulled out from accommodation space S, the magnetic detector 261 detects that the magnet 34 or 35 is not in the power supply paddle 28. According to this detecting information, the controller operates the communication antenna 31 or the infrared sensor 32. When charging the battery is conducted, the controller conducts interlock control by which charging is started after confirming that the power supply paddle 28 and the charging port are appropriately connected with each other. That is, a magnetic sensor is housed in the charging port. When the power supply paddle 28 is inserted into the charging port, the magnetic sensor detects the magnet 34 or 35 arranged in the power supply paddle 28. This detection signal is sent to the controller. Monitoring control is conducted by the controller in such a manner that charging is carried out while the charging condition of the battery is being confirmed. The above communication is conducted between the electric wave communicating means on the charging port side and the communication antenna 31 or between the infrared communication means on the charging port side and the infrared sensor 32.

FIG. 7 is a view showing a state in which the power supply paddle 28 is inserted into accommodation space S. In this insertion state, the hook sections 241, 251 of the positioning pieces 24, 25 are hooked by spring forces at the positioning recesses 363, 364, which are formed on the case 36 as shown in FIG. 8. The positioning protrusions 145, 146 are engaged with the positioning recesses (not shown) formed in the case pieces 361, 362. When the positioning protrusions 145, 146 are engaged with the positioning recesses, the depth of insertion of the power supply paddle 28 into accommodation space S is restricted.

According to the first embodiment, the following effects can be provided.

(1) When the first accommodation space forming body 14 and the second accommodation space forming body 14A are opposed to each other as shown in FIGS. 5 and 6, the engaging protrusion 173 of the first accommodation space forming body 14 and the engaging recess 193 of the second accommodation space forming body 14A can be engaged with each other, and at the same time the engaging recess 183 of the first accommodation space forming body 14 and the engaging protrusion 203 of the second accommodation space forming body 14A can be also engaged with each other. When the engaging protrusion 173 and the engaging recess 193 are engaged with each other and also the engaging recess 183 and the engaging protrusion 203 are engaged with each other, accommodation space S is formed between the first accommodation space forming body 14 and the second accommodation space forming body 14A. When accommodation space S is formed by combining a pair of accommodation space forming bodies 14, 14A of the same profile and size, the manufacturing cost of the supporting device of the power supply paddle 28 can be effectively reduced.

(2) According to the structure in which the engaging protrusions 173, 203 and the engaging recesses 193, 183 are opposed to each other in such a manner that accommodation space S is interposed between the engaging protrusions and the engaging recesses on one side of the single accommodation space forming body 14 or 14A, positions of the engaging protrusions 173, 203 are replaced with positions of the engaging recesses 193, 183 when the accommodation space forming body 14 or 14A is inverted so that the inside of the accommodation space forming body 14 or 14A can be replaced with the outside. Accordingly, the profile and size of the first accommodation space forming body 14 can be made to be the same as the profile and size of the second accommodation space forming body 14A so that the accommodation space forming bodies 14, 14A can be assembled to each other via the engaging protrusions 173, 203 and the engaging recesses 193, 183. According to the structure in which the engaging protrusions 173, 203 and the engaging recesses 193, 183 are opposed to each other in such a manner that accommodation space S is interposed between the engaging protrusions and the engaging recesses on one side of the single accommodation space forming body 14 or 14A, it is easy to make the profile and size of the accommodation space forming body 14 to be the same as the profile and size of the accommodation space forming body 14A so that accommodation space S can be formed by assembling the accommodation space forming bodies 14, 14A to each other.

(3) The forward end of the guiding protrusion 17 on the accommodation space forming body 14 side is joined to the forward end of the guiding protrusion 19 on the accommodation space forming body 14A side, and the forward end of the guiding protrusion 18 on the accommodation space forming body 14 side is joined to the forward end of the guiding protrusion 20 on the accommodation space forming body 14A side. The width of accommodation space S is twice the height of each guiding protrusion 17, 18, 19, 20. The guiding protrusions 17, 18, 19, 20, which determine the width of accommodation space S, guide the power supply paddle 28 when it is inserted into accommodation space S. These guiding protrusions 17, 18, 19, 20 are preferably used as positions at which the engaging protrusions 173, 203 and the engaging recesses 183, 193 are arranged.

(4) The engaging protrusion 173 on the first accommodation space forming body 14 side is closely contacted and engaged with the engaging recess 193 on the second accommodation space forming body 14A side.

The engaging recess 183 on the first accommodation space forming body 14 side is closely contacted and engaged with the engaging protrusion 203 on the second accommodation space forming body 14A side. The engaging recess 193 on the first accommodation space forming body 14 side is closely contacted and engaged with the engaging protrusion 173 on the second accommodation space forming body 14A side. The engaging protrusion 203 on the first accommodation space forming body 14 side is closely contacted and engaged with the engaging recess 183 on the second accommodation space forming body 14A side. Due to the above closely contacting engaging structure, the first accommodating space forming body 14 and the second accommodating space forming body 14A can be tightly assembled to each other.

(5) The hook sections 241, 251 of the positioning pieces 24, 25 composed of leaf springs are hooked at the positioning recesses 363, 364 of the power supply paddle 28 by an elastic force. The positioning pieces 24, 25 restrict the position of the power supply paddle 28 in the accommodation space S and at the same time prevent the power supply paddle 28 from coming out from the accommodation space S.

(6) The positioning pieces 24, 25 composed of leaf springs are preferably used as a means for preventing the power supply paddle 28 from coming out from accommodation space S.

(7) When the engaging protrusions 173, 203 and the engaging recesses 183, 193 are arranged in the first accommodating space forming body 14 and the second accommodating space forming body 14A of the same profile and size, it is necessary to strictly design the positions and profiles of the engaging protrusions 173, 203 and the engaging recesses 183, 193. Compared with metal, synthetic resin can be easily formed according to the design. When the structure is adopted in which the engaging protrusions 173, 203 and the engaging recesses 183, 193 are integrally formed in the accommodation space forming bodies 14, 14A made of synthetic resin, the engaging protrusions 173, 203 and the engaging recesses 183, 193 can be easily formed according to the design. When the accommodation space forming bodies 14, 14A are made of synthetic resin, the manufacturing cost of the supporting device can be reduced.

(8) In order to easily insert the screws 16 into the insertion holes 121, 141, the diameters of the insertion holes 121, 141 are made larger than those of the screws 16. Due to the above structure, there is a possibility that the supporting base plate 12 and the accommodation space forming body 14 become loose when fastening is conducted only by the screws 16. However, the first accommodation space forming body 14 is joined to the supporting base plate 12 via the close engagement of the positioning protrusions 22, 23 with the positioning holes 123, 124. Accordingly, there is no possibility that the supporting base plate 12 and the accommodation space forming body 14 become loose.

(9) When the power supply paddle 28 is completely inserted into accommodation space S as shown in FIG. 7, the magnetic detector 261 detects the magnet 34 or 35 in the power supply paddle 28. When the power supply paddle 28 is in accommodation space S, it is unnecessary for the electric wave communication means or the infrared ray communication means to be operated. The magnetic detector 261 is a preferable means for confirming the presence of the power supply paddle 28 in accommodation space S.

(10) In order to positively confirm whether or not the power supply paddle 28 is in accommodation space S, it is necessary to determine the accommodating position of the power supply paddle 28 in accommodation space S. In order to easily insert the screws 16 into the insertion holes 151, diameters of the insertion holes 151 are made larger than those of the screws 16. Due to the above structure, there is a possibility that the positioning body 15 and the accommodation space forming body 14A become loose when fastening is only conducted by the screws 16. When the positioning body 15 becomes loose with respect to the second accommodation space forming body 14A, the accommodating position of the feeder paddle 28, the positioning pieces 24, 25 of which are hooked at the positioning recesses 363, 364 by elastic forces, cannot settle at a predetermined position. The positioning body 15 is joined to the accommodation space forming body 14A via the close engagement of the positioning protrusions 22, 23 with the positioning holes 154, 153. Accordingly, there is no possibility that the positioning body 15 becomes loose with respect to the accommodation space forming body 14A. The structure, in which the positioning body 15 for supporting the positioning pieces 24, 25 is attached to the accommodation space forming body 14A via the positioning protrusions 22, 23, is effective to set the accommodating position of the power supply paddle 28 in accommodation space S.

Figure 9:
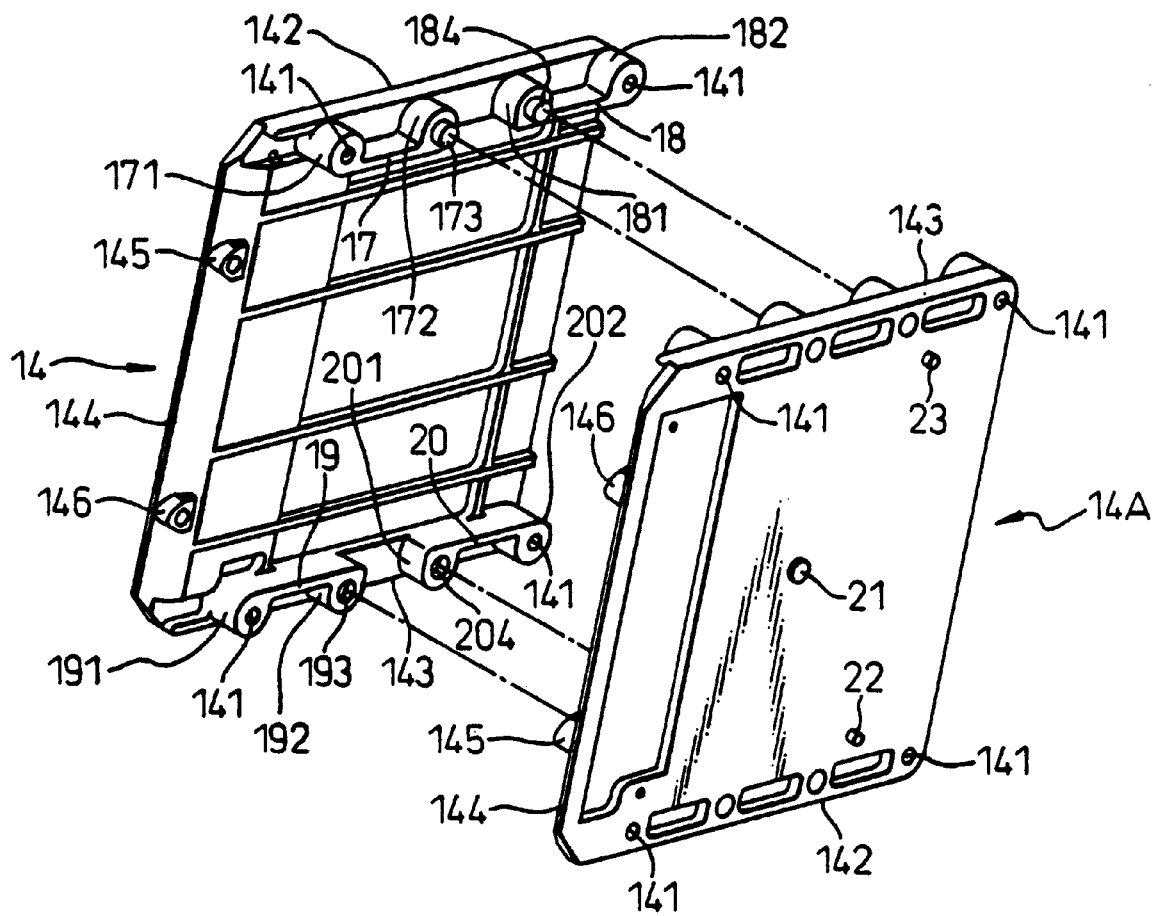
FIG. 9 is an exploded perspective view of the supporting device for the power supply paddle of the second embodiment of the present invention, wherein a primary portion of the supporting device for the power supply paddle is shown in the drawing.

Next, the second embodiment shown in FIG. 9 will be explained below. Like reference characters are used to indicate like parts in the first and the second embodiment.

In this embodiment, the engaging protrusions 173, 184 are formed in the columnar sections 172, 181 of the guiding protrusions 17, 18 on the side 142, and the engaging recesses 193, 204 are formed in the columnar sections 192, 201 of the guiding protrusions 19, 20 on the side 143. The engaging protrusion 184 on the accommodation space forming body 14 side is engaged with the engaging recess 204 on the accommodation space forming body 14A side. It is possible for this embodiment to provide the same effect as that of the first embodiment.

Figure 10:
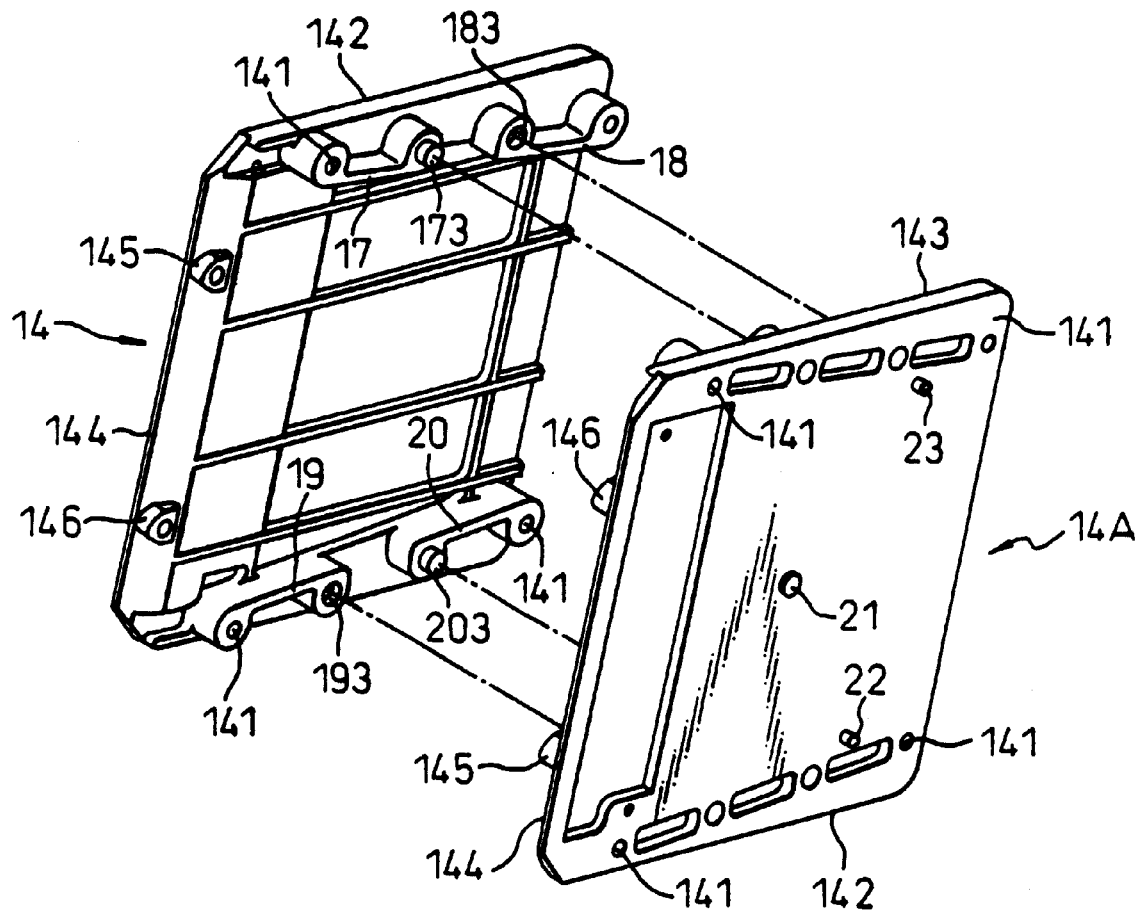
FIG. 10 is an exploded perspective view of the supporting device for the power supply paddle of the third embodiment of the present invention, wherein a primary portion of the supporting device for the power supply paddle is shown in the drawing.
Figure 11:
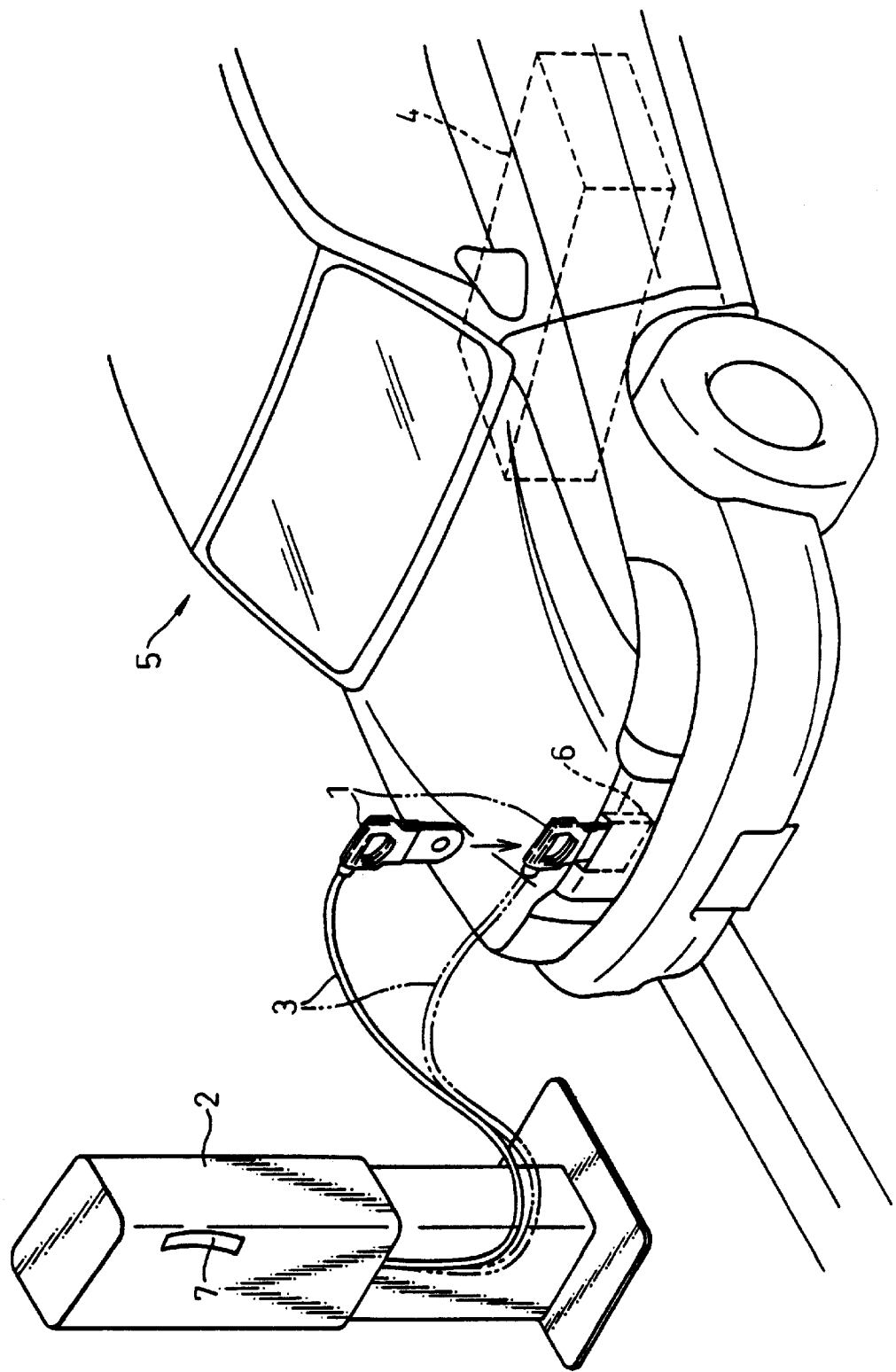
FIG. 11 is a perspective view showing a conventional charger.

Next, the third embodiment shown in FIG. 10 will be explained below. Like reference characters are used to indicate like parts in the first and the third embodiment.

In this embodiment, the guide protrusions 17, 18 are arranged in series and oblique to the side 142, and also the guide protrusions 19, 20 are arranged in series and oblique to the side 143. The guiding protrusions 17, 19 are arranged in such a manner that an interval between the guiding protrusions 17, 19 is gradually extended closer to the side 144 while accommodation space S is interposed between the guiding protrusions 17, 19. The guiding protrusions 18, 20 are arranged in such a manner that an interval between the guiding protrusions 18, 20 is gradually extended closer to the side 144 while accommodation space S is interposed between the guiding protrusions 18, 20. When the guiding protrusions 17, 18, 19, 20 are arranged being opposed to each other while the interval between the guiding protrusions is gradually extended closer to the side 144 and accommodation space S is interposed between the guiding protrusions, the power supply paddle 28 can be smoothly inserted into accommodation space S.

According to the present invention, it is possible to execute the following embodiments.

(a) One engaging protrusion and one engaging recess may be arranged in a single accommodation space forming body.
(b) Not less than three engaging protrusions and not less than three engaging recesses may be arranged in a single accommodation space forming body.
(c) In the third embodiment, the guiding protrusions 17, 18 may be opposed to each other in such a manner that an interval between the guiding protrusions 17, 18 is gradually extended closer to the side 144 while accommodation space S is interposed between the guiding protrusions 17, 18, and the guiding protrusions 18, 20 are arranged, while being opposed to each other, in parallel.

As described in detail before, according to the present invention, the profile and size of the first accommodation space forming body is made to be the same as those of the second accommodation space forming body, and the engaging protrusions and the engaging recesses, the numbers of which are the same, are provided on one side of the first accommodation space forming body and also on one side of the second accommodation space forming body, and the engaging protrusions of one of the first accommodation space forming body and the second accommodation space forming body are engaged with the engaging recesses of the other, so that the accommodation space is formed between the first and the second accommodation space forming body. Therefore, the present invention can provide a supporting device for a power supply paddle at low cost.

While the invention has been described by reference to specific embodiments chosen for purpose of illustration, it should be apparent that numerous modifications could be made by those skilled in the art without departing from the basic concept and scope of the invention.

What is claimed is:

1. A supporting device for a power supply paddle for feeding electricity from a power source to a power receiving device using electromagnetic induction, comprising:

a first accommodation space forming body for forming an accommodation space to accommodate the power supply paddle capable of being taken in and out; and a second accommodation space forming body for forming an accommodation space to accommodate the power supply paddle being combined with the first accommodation space forming body in such a manner that the second accommodation space forming body is opposed to the first accommodation space forming body, wherein the profile and size of the first accommodation space forming body is the same as those of the second accommodation space forming body, engaging protrusions and engaging recesses, the numbers of which are the same, are provided on one face of the first accommodation space forming body and also on one face of the second accommodation space forming body, and the engaging protrusions of one of the first accommodation space forming body and the second accommodation space forming body are engaged with the engaging recesses of the other accommodation space forming body so that the accommodation space is formed between the first accommodation space forming body and the second accommodation space forming body.

2. A supporting device for a power supply paddle according to claim 1, wherein the engaging protrusions and the engaging recesses in a single accommodation space forming body are opposed to each other in such a manner that the accommodation space is interposed between the engaging protrusions and the engaging recesses.

3. A supporting device for a power supply paddle according to claim 2, wherein both the engaging protrusions and the engaging recesses in a single accommodation space forming body are plural and respectively arranged on a pair of planes which are reflection-symmetrical with respect to the accommodation space.

4. A supporting device for a power supply paddle according to claim 3, wherein the single accommodation space forming body includes an even number of guiding protrusions for guiding the power supply paddle when it is inserted into the accommodating space, the even number of guiding protrusions are arranged being reflection-symmetrical to each other in such a manner that the accommodation space is interposed between the even number of guiding protrusions, and the engaging protrusions and the engaging recesses are formed in the even number of guiding protrusions.

5. A supporting device for a power supply paddle according to claim 1, wherein the power supply paddle includes positioning recesses, a plurality of positioning protrusions are arranged on a side of a single accommodation space forming body having no engaging protrusions and engaging recesses, a positioning piece hooked at the positioning recess of the power supply paddle by an elastic force is arranged in a positioning body, and the positioning body is joined to the accommodation space forming body by the engagement of the positioning protrusion with the positioning body.

6. A supporting device for a power supply paddle according to claim 5, wherein the positioning piece is a leaf spring attached to the positioning body.

7. A supporting device for a power supply paddle according to claim 1, wherein the first accommodation space forming body and the second accommodation space forming body are made of synthetic resin.

8. A supporting device for a power supply paddle according to claim 5, wherein the plurality of positioning protrusions are integrally formed in a single accommodation space forming body.

9. A supporting device for a power supply paddle according to claim 1, wherein the power supply paddle includes a magnet for detecting a position, and a magnetic detector for detecting the magnet is attached to the first or the second accommodation space forming body.

* * * * *